Nov. 28, 1961  H. W. BUZZELL  3,010,284
CANAL LOCK FENDERS
Filed March 31, 1960  3 Sheets-Sheet 1
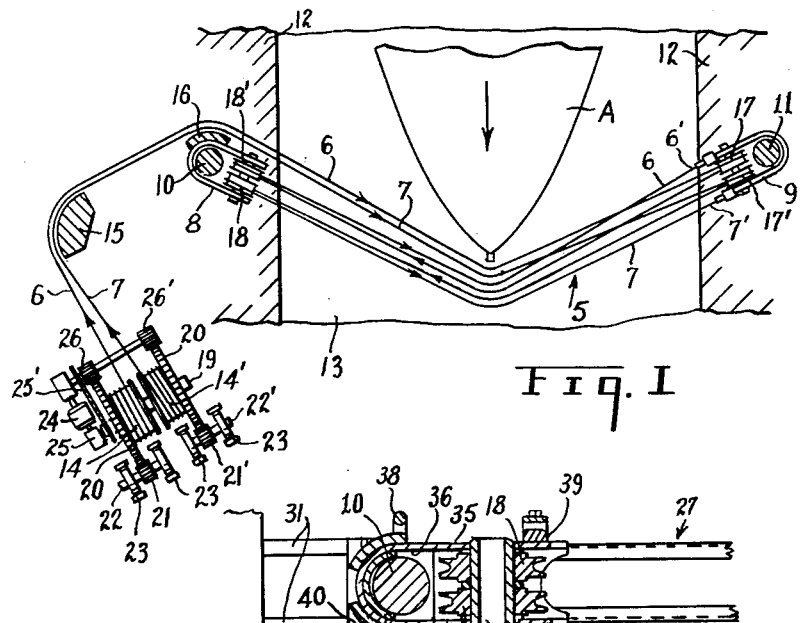
Fig. 1
Fig. 5
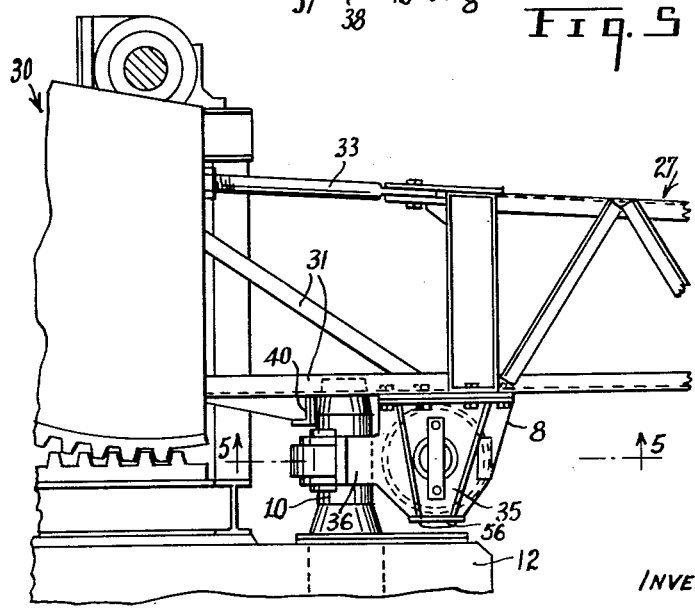
Fig. 4
INVENTOR
H. W. BUZZELL
By Fetherstonhaugh & Co.
Attorneys

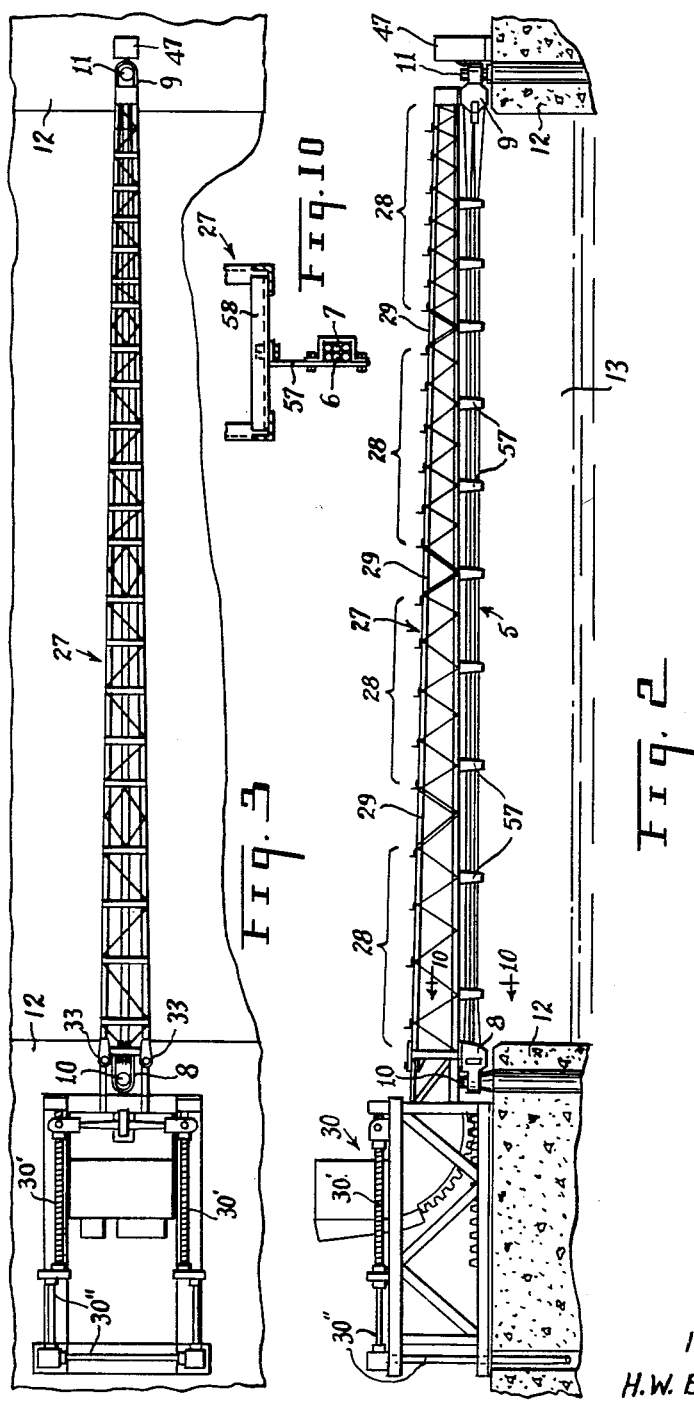

Nov. 28, 1961   H. W. BUZZELL   3,010,284
CANAL LOCK FENDERS
Filed March 31, 1960   3 Sheets-Sheet 3
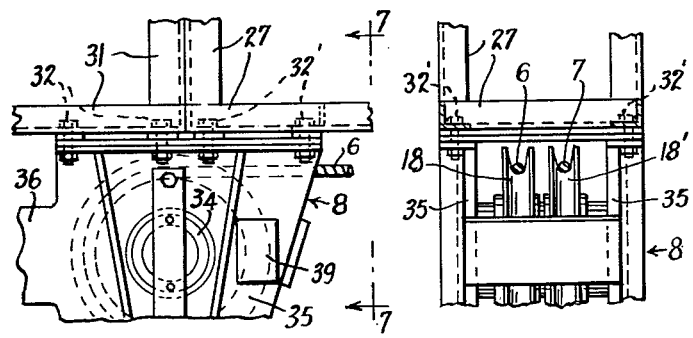
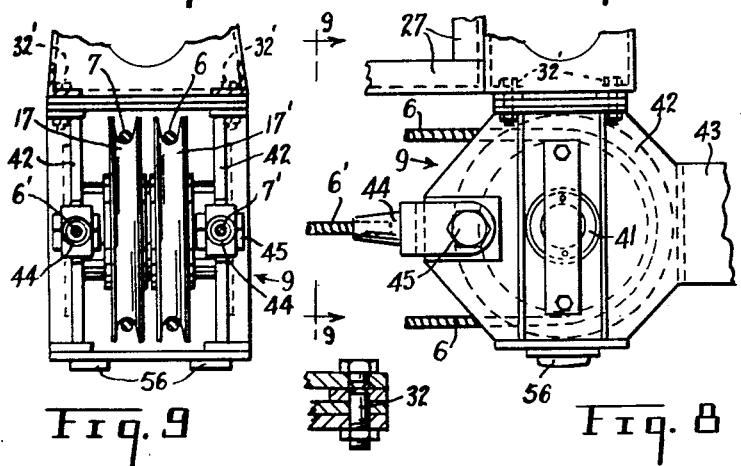
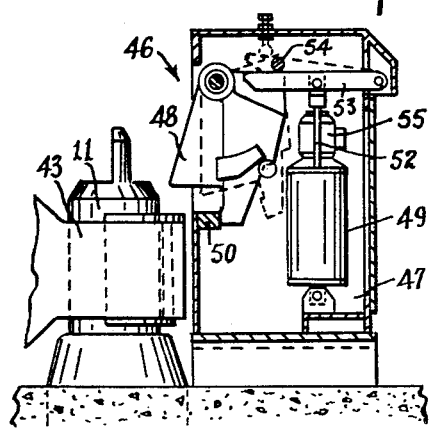
INVENTOR
H. W. BUZZELL
ATTORNEYS United States Patent Office 3,010,284
Patented Nov. 28, 1961

3,010,284
CANAL LOCK FENDERS
Henry W. Buzzell, Montreal West, Quebec, Canada, assignor to Dominion Bridge Company, Limited, Montreal, Quebec, Canada
Filed Mar. 31, 1960, Ser. No. 19,065
7 Claims. (Cl. 61—8)

This invention relates to improvements in canal lock fenders for the protection of the canal lock gates against forward moving ships, and more particularly to means whereby a multiple lay cable fender strung across a canal lock is kept in tension by a high value of friction forces for the purpose of retarding and eventually bringing the forward movement of a ship to a complete stop with a minimum pay-out of cable before the ship reaches a minimum distance short of the lock gates.

The invention consists essentially in supporting a multiple lay cable fender of a fracturable boom spanning the width of a canal at a desired distance in front of the lock gates of the canal, the multiple lay of the cable being carried in pulley sheave members which are anchored on fixed bollards on either side of the canal, the fracturable boom separating from the cable fender when the boom is struck by a ship, leaving the cable fender to take the full forward force of the ship. The cable fender is held in tension by a large friction force against pay-out of the cable when a ship, on its forward movement, strikes and fractures the boom, leaving the multiple lay of cable to take the full forward thrust of the ship until the applied friction forces on the cable slows up and stops pay-out of the cable and so arrest and stop the forward movement of the ship before it can reach the gates of the canal.

The multiple lay of the cable is supported on the fracturable boom on cable supports which will themselves separate from the boom and the cables. The boom is usually made up in a number of sections joined together end to end by shear bolts so that when the boom is struck by a ship, the sections and the cable supports will readily separate from each other and from the boom operating mechanism, leaving the multiple lay of cable stretched across the canal between the cable anchoring bollards. The multiple lay of cables spanning the canal will remain in place independent of the boom and its operating mechanism, holding the ship against further forward movement until such time as the ship is safely warped against the side of the canal, after which the cables and pulleys sheave members can be removed from their bollards to allow normal forward passage of the ship through the canal. The separate sections of the boom normally would receive little damage from the crash of the ship and can be quickly repaired or replaced with spare sections and joined together again along with the cable supports, and the cable assemblies can again be anchored if undamaged on their bollards or replaced with new ones ready for action should another ship approach the lock gates with excessive speed.

The object of the invention is to provide a multiple lay cable fender for the protection of canal lock gates in which the cables are held in tension by friction forces restraining the pay-out of the cables when the cables are contacted by a moving ship.

A further object of the invention is to provide a support boom for the cable fender, which support boom is made up of sections joined together by shear bolts and the cables are supported on the boom by shear members.

A further object of the invention is to provide sheave pulley members about which the cables are laid, the sheave pulley members being anchored to fixed bollards on either side of the canal.

A further object of the invention is to provide a multiple lay cable fender in which one end of each cable is securely anchored at one side of the canal and the other end of each cable is secured to a retarding drum on the other side of the canal permitting pay-out of the cable against a friction restraining force.

A further object of the invention is to provide a system of fixed friction surfaces over which the cables of the fender are laid, and the stem of the ship is included in the above friction system.

A further object of the invention is to provide rigid anchors on either side of the canal for the multiple lay cables which will permit freedom of pay-out and rewind of the cables and permit the cables and pulley sheave members to be moved and/or change angle in a horizontal plane on contact of the cables by a forward moving ship.

A further object of the invention is to provide means whereby the cables and pulley sheave members will be prevented from rising off their anchoring bollards independently of the cable supporting boom.

A further object of the invention is to provide a multiple lay cable fender in which the retarding drums, rewind mechanism etc., are all located at one side of the canal and only an anchor bollard and a simple locking device are required at the other side of the canal.

These and other objects of the invention will be apparent from the following detailed description of the invention and the accompanying drawings, in which:

FIG. 1 is a plan view in diagrammatic form showing the cable fender free of any supporting boom and as it is payed-out by the forward movement of a ship and showing the fixed and mechanical means for applying high friction forces on the cables to slow up and arrest the pay-out of the cables and to stop forward movement of the ship.

FIG. 2 is a vertical elevation showing a transverse section of a ship canal and showing the lock fender in its lowered position with the multiple lay of cables supported by the boom and anchored on the fixed bollards at the sides of the canal.

FIG. 3 is a plan view of the lock and lock fender shown in FIG. 2.

FIG. 4 is an enlarged partial vertical elevation of the pivoted end of the boom and showing the cable pulley sheave member secured to the boom and fitted over the cable anchoring bollard.

FIG. 5 is a partial horizontal sectional view looking in the direction of the arrows 5—5 in FIG. 4.

FIG. 6 is an enlarged partial vertical side elevation of the cable pulley sheave member mounting shown in FIG. 4.

FIG. 7 is a vertical end view looking in the direction of the arrows 7—7 in FIG. 6.

FIG. 8 is an enlarged partial vertical side elevation of the cable pulley sheave member mounted on the outer end of the cable support boom.

FIG. 9 is a vertical sectional view looking in the direction of the arrows 9—9 in FIG. 8.

FIG. 10 is a section of the lower portion of the cable support boom on the line 10—10 of FIG. 2 and showing a typical cable support.

FIG. 11 is a sectional view showing a typical shear bolt assembly by means of which sections of the support boom are held together and by means of which the cable support brackets and the cable pulley sheave members are secured to the cable support boom.

FIG. 12 is a vertical elevation, partly in section showing one method of latching the outer cable pulley sheave member to its anchoring bollard.

Referring to the drawings and particularly to FIG. 1. In the diagrammatic view shown in FIG. 1 the cable support boom is not shown, as at the stage illustrated, the forward movement of the ship A has already fractured the boom and separated it from the cable fender and the cable fender alone performs the duty of arresting and bringing to a stop the forward movement of the ship. The canal gates which the cable fender protects are not shown as all protective action takes place before the ship can reach the gates.

In the application illustrated in FIG. 1 the cable fender 5 is made up of two separate cables 6 and 7. However, it is to be understood only one cable or more than two cables could be used depending upon the size and tonnage of the ships normally to be stopped by the cable fender 5. As illustrated, the cable pulley sheave members 8 and 9 are hooked over the bollards 10 and 11 which are firmly anchored on the banks 12 of the canal 13. One end of the cable 6 is securely anchored to its retarding drum 14 and is passed about the fixed bollard 15 and the friction surface 16 on the pulley sheave member 8, thence about the pulley 17, in the pulley sheave member 9, back over the pulley 18' in the pulley sheave member 8 and then back to the pulley sheave member 9 to which the other end 6' of the cable is securely anchored. In a similar manner one end of cable 7 is anchored to its retarding drum 14' and is passed about the fixed bollard 15 and the friction surface 16 of the pulley sheave member 8, thence about the pulley 17' in the pulley sheave member 9, back over the pulley 18 in the pulley sheave member 8 and then back to the pulley sheave member 9 to which the other end 7' of the cable is securely anchored.

The retarding drums 14—14' are journalled on a common shaft 19 and each are provided with a ring gear 20 engaging with spur gears 21—21' on separate shafts 22—22'. Each shaft 22 or 22' is provided with a pair of friction brakes 23 by means of which the desired friction force is applied through the gears to the retarding drums 14—14' to slow up and stop the pay-out of the cables 6 and 7 when the ship A moves forward against the cables in the manner illustrated in FIG. 1.

After a ship A has caused the cables 6 and 7 to be payed out and the ship brought to a stop the brakes 23 can be released and the cables can be rewound on their drums 14—14' by means of the motor 24 driving through the reduction gear 25 and the chain and sprockets 25' to rotate the gears 26—26' which are in engagement with the ring gears 20. After the cables 6 and 7 have been rewound or replacement cables wound on their drums 14—14' the brakes 23 are then engaged to hold the cables in tension for another ship stopping operation. The motor drive to the gears 26—26' can be disengaged by means of a clutch or clutches after the rewinding operation.

Referring now more particularly to FIGS. 2 to 12 of the drawings in which the details of the structure of the lock fender is described.

The cable support boom 27 supporting the cables 6 and 7 and the pulley sheave members 8 and 9 can be fabricated in any suitable manner and is here shown as being made up of a number of sections 28 joined end to end by shear members 29 so as to be readily broken into sections when struck by a ship. The cable support boom 27 is here shown in the form of a bascule having suitable pivoting mechanism 30 by means of which the boom 27 can be raised into a vertical position. The boom 27 is joined to the pivoting mechanism 30 by suitable shear bolts so that the section 28 of the boom 27 adjacent to the pivoting mechanism can move in a horizontal plane at the time of shearing so as not to put any undue side strain on the mechanism 30. A suitable form of shear bolt 32 is shown in FIG. 11. While a bascule form of cable support boom is shown and described it will be understood that other suitable devices could be used to lay the cable fender across the canal or retract it to allow passage of ships.

The pulley sheave member 8 is secured to the under side of the boom 27 only during erection, or when part of a boom replacement assembly, by bolts 32'. It is secured to the under side of the frame 31 forming a part of the mechanism 30 during normal operation and is held in place by means of the shear bolts 32. These shear bolts permit shearing in a horizontal plane between the pulley sheave member 8 and the frame 31 when the boom is pushed by a ship. Tension rods 33 are pinned at one end to boom 27 and are designed to break at their threaded ends where they connect to pivoting mechanism 30, when the boom is displaced by a ship.

The pulley sheave member 8 carries the sleeve 34 in holes bored in the vertical side walls 35, and the pulleys 18 and 18' are journalled on the sleeve 34 to rotate freely with movement of the cables 6 and 7. The side walls 35 of the sheave block 8 are extended to form a closed loop member or thimble 36 adapted to fit over the bollard 10. This loop member 36 may be fitted with an inner contact plate 37 to bear against the cylindrical surface of the bollard. The friction surface 16 is built up on the outer surface of the loop member 36 and a pair of cable guides 38 and 39 are also provided on the outer surface of the sheave block to guide the two outer lays of the cables 6 and 7 as they are passed over the friction surface 16 to keep the two outer lays centrally disposed horizontally in relation to the lays of cable passing over the pulleys 18 and 18'.

The frame 31 is provided with a stop member 40 on its under side. This stop member 40 is located immediately above the outer end of the loop member 36, and when the boom is in the lowered position, as seen in FIG. 4, prevents the pulley sheave member 8 from being pulled up and off the bollard 10 when the boom 27 has been separated from the pulley sheave member 8 and the frame 31 by forward movement of a ship. It also prevents the mechanism 30 from being displaced at the time the boom breaks.

At the outer or free end of the boom 27 the pulley sheave member 9 is secured to the boom by shear bolts 32 with the shear bolts 32 permitting shear to take place between the pulley sheave member 9 and the boom 27 in a horizontal plane. The pulley sheave member 9 carries the sleeve 41 in holes bored in the vertical side walls 42 and the pulleys 17 and 17' are journalled on the sleeve 41 to rotate freely with movement of the cables 6 and 7. The side walls 42 are extended to form a closed loop member or thimble 43 adapted to fit over the bollard 11. This loop member 43 may be fitted with an inner contact plate similar to the plate 37 on the loop member of the pulley sheave member 8. The ends 6' and 7' of the cables 6 and 7 are firmly secured in cable sockets 44 which in turn are bolted to the side walls 42 of the pulley sheave member 9 by the bolts 45. The cable sockets 44 are disposed at right angles to the horizontal axis of the pulleys 17 and 17' and are horizontally in line with the cable guides 38 and 39 on the pulley sheave member 8.

A latch mechanism 46 is housed in the cabinet 47. This latch mechanism may be of any suitable type and is here shown as having a latch 48 normally held by its own weight against the stop 50 and is free to move inwards of the cabinet 47 when contacted by downward movement of the loop member 43 when the boom 27 is lowered into position across the canal 13. The latch 48 is released from its locking position, shown in FIG. 12 by a "thrustor" mechanism 49. This thrustor, when energized, exerts an upward thrust through the rods 52 to force the lever 53 against the pin 54 on the latch 48, causing the latch 48 to rotate inwards in the cabinet 47 and clear of the loop member 43 to permit the boom 27 to be raised. The operation of this thrustor 49 can be carried out remotely from the opposite side of the canal at the location of the boom raising mechanism. The thrustor 49 may be of any suitable type such as that manufactured by General Electric and identified as CR9504 which is operated by the motor 55 which rotates an impeller to build up oil pressure against a piston to which the rods 52 are attached.

Both pulley sheave members 8 and 9 are provided with shoe plates 56 on their under sides in order to support the sheave members when they drop down on to the bollard skid plates after losing the support of the boom 27 when the boom is sheared away from the pulley sheave members by the forward movement of a ship.

The lay of the cables 6 and 7 extending across the canal between the pulley sheave members 8 and 9 are supported in the brackets 57, the brackets being broken apart when the ship hits the boom. The brackets 57 are secured to the cross members 58 of the boom 27 by shear bolts 32.

In the operation of this invention, the two elements, the boom and the cable fender are combined as a single unit and are moved from a vertical position to a horizontal position by means of the rolling bascule mechanism 30 operated by means of the horizontal screws 30', driven by a system of motorized shafts and gears 30''.

The boom 27 is the carrying element for the cable fender 5 with its pulley sheave members 8 and 9. The boom, on being struck by a ship, separates into the individual sections 28, shearing off from connection with the bascule mechanism 30 and with the pulley sheave members 8 and 9. The sections 28 of the boom may or may not all break their connection with the cable support brackets 57. This will depend on the forces exerted on the cable fender 5 by the moving ship at the location of the various sections and to the weight of the individual sections left suspended from the brackets 57.

The forward movement of the ship forces the cable fender to lengthen as it is carried beyond the barrier line, so that the various parts of the cable slide around the pulleys at the bollards 10 and 11 and across the stem of the vessel. With one end of the cables 6 and 7 being securely anchored to the pulley sheave member 9 and through it to the bollard 11, the other end of the cables un-reel off the retarding drums 14 and 14'. The retarding force that brings the ship to a stop, is induced by friction between the ropes and the bollards, the stem of the ship, and the shoe brakes which form a part of the retarding drum assemblies.

The brakes 23 will be capable of being set at any desired load capacity, and will be fitted with a hand release device. The retarding drum assemblies will be so arranged that the brake drums of each pair of brakes may be sepaartely power driven with the brake shoes lightly on in order to test the action of the brakes 23 and remove any accumulated rust or dirt and so ensure that they will deliver the desired constant braking force. The power drive for the drums will be de-clutched during normal operation of the fender and will normally form a part of the rewind mechanism for reeling the cables back on to the retarding drum during installation or re-reeving after an accident.

During the actual displacement of the cable boom by a ship, the pulley sheave members 8 and 9 are free to pivot on the bollards 10 and 11 without strain on the bascule mechanism so that they may follow the changing angle of the fenderropes caused by the prow of the moving ship.

While the retarding drums and rewind mechanism is shown in diagrammatic form in FIG. 1, it is to be understood that all of that mechanism can be housed at ground level in line with the cable boom 5 or it may be housed underground. In either case suitable guide pulleys or friction surfaces will be installed between the retarding drums and the pulley sheave members 8.

During the time a ship is being brought to a stop by the cable fender 5 the fender is secured against lifting off its anchoring bollards by suitable latching means at each bollard. In addition the lower portion of the frame 31 of the bascule is a snug fit about the top of the bollard 10 so that the boom reaction at the time of collision is transferred to the bollard, thus protecting the bascule structure against damage.

What I claim is:

1. A multiple lay cable fender for canals and the like comprising, a pair of bollards anchored opposite each other on either side of the canal, a lift boom spanning said canal in line with said bollards, a cable sheave mounted at each end of said lift boom, each of said cable sheaves adapted to engage with the said bollards when the said lift boom is in its lowered position, a cable retarding mechanism located on one side of said canal, a cable anchored at one end to said cable retarding mechanism and reeved about said cable sheaves to form a multi-lay cable fender, the opposite end of said cable being anchored to one of said cable sheaves, means to retain said cable sheaves on said bollards, and means to support said cable fender on said lift boom, the said lift boom being shearable from said cable fender on impact of a ship striking the lift boom, the said cable sheaves being rotatable on the said bollards in a horizontal plane when the said lift boom has been sheared, permitting the said cable fender to lengthen against the tension of said cable retarding mechanism.

2. A multiple lay cable fender as set forth in claim 1 in which the cable sheave adjacent the cable retarding mechanism is provided with friction surfaces on its outer face over which the cables are laid before being laid about the cable sheaves.

3. A multiple lay cable fender as set forth in claim 1 in which the said lift boom include a series of cable carrying brackets secured to the said cable support means by shear bolts.

4. A multiple lay cable fender for canals and the like comprising, a pair of bollards anchored opposite each other on either side of the canal, a lift boom spanning said canal in line with said bollards, a cable sheave mounted at each end of said lift boom, each of said cable sheaves adapted to engage with the said bollards when the said lift boom is in its lowered position, a cable retarding mechanism located on one side of said canal, said cable retarding mechanism including a pair of retarding drums, friction brakes associated with said retarding drums, a pair of cables, each of said cables being anchored at one end to one of said retarding drums and reeved about said cable sheaves to form a multi-lay cable fender, the opposite ends of said cables being anchored to the cable sheave remote from said retarding drums, means to retain said cable sheaves on said bollards and means to support said cable fender on said lift boom, the said lift boom being shearable from said cable fender on impact of a ship striking the lift boom, the said cable sheaves being rotatable on the said bollards in a horizontal plane when the said lift boom has been sheared, permitting the said cable fender to lengthen against the tension of said cable retarding mechanism.

5. A multiple lay cable fender as set forth in claim 4 in which the cables from the retarding mechanism are first passed over friction surfaces on the outer face of the cable sheave adjacent the retarding mechanism and are thence reeved about said cable sheaves.

6. A multiple lay cable fender as set forth in claim 4, in which the said retarding drums include adjustable friction brakes controlling the pay-out of the said cables when the said lift boom has been sheared.

7. A multiple lay cable fender as set forth in claim 6, in which the said retarding mechanism includes cable rewind mechanism operable when the said friction brakes are released.

References Cited in the file of this patent

UNITED STATES PATENTS 862,066    Fetch _____ July 30, 1907

FOREIGN PATENTS 181,246    Austria _____ Feb. 25, 1955